United States Patent Office 3,033,878
Patented May 8, 1962

3,033,878
ARYL CHROMIUM COMPOUNDS AND
THEIR PREPARATION
Harold H. Zeiss and Walter Herwig, Dayton, Ohio, assignors to Monsanto Chemical Company, St. Louis, Mo., a corporation of Delaware
No Drawing. Filed June 2, 1958, Ser. No. 739,063
11 Claims. (Cl. 260—346.1)

The present invention is directed to a method of preparing organo-transition metal compounds possessing true covalent carbon-to-metal bonds. The invention is further directed to isolated, solid group VI metal-organo compounds having true covalent carbon-to-metal bonds. The invention is further directed to solid triaryl chromium compounds in which the aryl groups are bound to chromium by covalent bonds. The invention is also directed to solid triaryl chromium compounds solvated with tetrahydrofuran.

In one aspect, the invention is directed to the process of preparing organo-chromium compounds by reacting Grignard reagents with chromyl chloride or chromic chloride in the presence of tetrahydrofuran. In another aspect, the invention is directed to the process of preparing organo-molybdenum compounds by reacting Grignard reagents with molybdenum pentachloride or molybdenum tribromide in the presence of tetrahydrofuran. In another aspect, the invention is directed to the process of preparing organo-tungsten compounds by reacting tungsten hexachloride or tungsten hexaphenolate with Grignard reagents in the presence of tetrahydrofuran.

In yet another aspect, the present invention is directed to a tetrahydrofuran-solvated form of chromic trichloride and to a method of preparing this complex and its use in the preparation of organo-chromium compounds.

In still another aspect, the present invention concerns the production of bis(arene) metal compounds of group VI metals by reacting aryl Grignard reagents with group VI metal halides in tetrahydrofuran, removing tetrahydrofuran from the product and hydrolyzing to produce bis(arene) metal compounds. A special embodiment of this aspect involves conducting the hydrolysis in the absence of oxygen to produce bis(arene) metal compounds in which the metal is in zero valence state.

The invention further concerns the general application of oxygen-free hydrolysis to the Grignard complexes produced by reaction of aryl Grignard reagents and group VI metal halides in Grignard solvent, to produce bis(arene) metal compounds in which the metal is in zero valence state.

The invention is further directed to the conversion of tetrahydrofuran-solvated trivalent chromium compounds to trivalent chromium compounds containing lesser amounts of solvated tetrahydrofuran, and to the rearrangements of tetrahydrofuran-solvated trivalent chromium compounds to π-complexed structures through removal of tetrahydrofuran.

In another phase, the present invention concerns the addition or coupling reactions of tetrahydrofuran-solvated organo-metal compounds of group VI metals with Grignard reagents.

The term "solvated" as employed herein is intended to designate molecular bonding or association of a type similar but not necessarily identical to that involved in hydrates of chemical compounds.

The novel process of preparing organo-metal compounds taught herein is illustrated by the following equation employing CrCl₃ as an exemplification of a transition metal reactant.

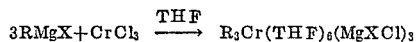

in which R is a monovalent organic radical attached to metal by carbon-to-metal bonding; X is a Grignard halogen; and THF represents tetrahydrofuran. The magnesium halide in the product can be easily removed to leave the tetrahydrofuran-solvated form of the organo-metallo compound. A particular example of the above general reaction is represented by the equation:

The magnesium halide is easily removed from the product, for example, by diluting a tetrahydrofuran solution of the product with diethyl ether to precipitate

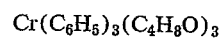

as a dark red crystalline precipitate. The tetrahydrofuran is essential to the stability of this covalent Cr<sup>III</sup> compound, for when it is removed by triturating the dry compound with ether, a black pyrophoric material is obtained which upon hydrolysis gives π complexes—bis(benzene)-chromium and (benzene)(diphenyl)chromium—which have "sandwich"-type structure, for example:

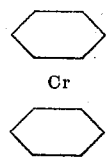

Similarly, if the tetrahydrofuran is removed from the solvated triphenyl chromium by vacuum, the π complex is obtained by rearrangement. For the removal of tetrahydrofuran by trituration, other solvents, e.g., Grignard solvents less basic than tetrahydrofuran, such as dioxane, can be employed.

Various reactions of aryl Grignard reagents with chromic chloride have been reported heretofore. However, in none of these reported reactions could a true covalent organo chromium compound have been isolated, as in every case ether was used as solvent, and the covalent organo chromium compounds, if present, would necessarily have rearranged to π complexes. The π complex or "sandwich"-type compounds are described in the copending application of Harold H. Zeiss, S.N. 616,224.

In the illustrative examples and in the general discussion herein, chromium and chromium compounds are employed as exemplifications of group VI metals and metal compounds, respectively, particularly of those group VI metals of atomic number up to 74.

The present invention concerns not only the preparation of organo-transition metal compounds, but also the procedures involved in converting such compounds to π-complexed structures. The following chart is illustrative of some of the various procedures contemplated in the present invention. In the chart, chromium is exemplary of transition metals, and CrCl₃ is exemplary of transition metal halides and other transition metal compounds which can be employed; phenyl magnesium halide is exemplary of Grignard reagents and phenyl is exemplary of aryl and other monovalent organo radicals capable of forming Grignard reagents; benzene is exemplary of arene groups; and ether (i.e., diethyl ether) is exemplary of Grignard solvents other than tetrahydrofuran. In the chart, the abbreviation THF is used to designate tetrahydrofuran, and A is used to designate a monovalent anion.

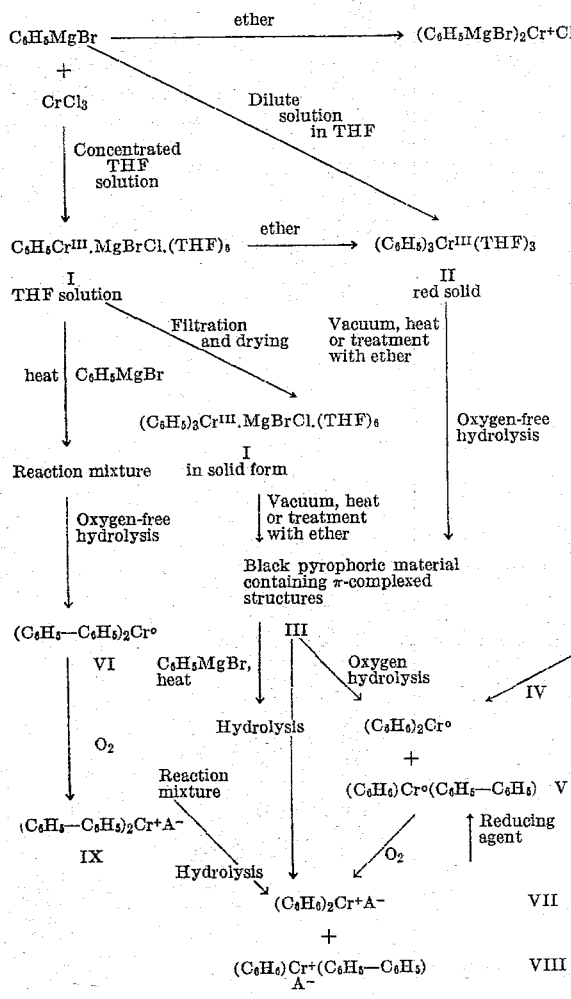

The following examples are illustrative of the present invention.

*Example 1*

The following reaction is carried out in an inert atmosphere in the absence of moisture, for example, under G.E. lampgrade nitrogen. A tetrahydrofuran solution of phenyl magnesium bromide (92.5 ml., 87 mmol., 0.94 N), after cooling to −20 C. in a Schlenk tube, is diluted with 50 ml. of terahydrofuran and then treated with 4.5 grams of anhydrous chromic trichloride (28.5 mmol.) previously stored over $P_2O_5$. The magnetically stirred suspension immediately becomes brownish-green in color; and after 8 hours of stirring at the same temperature the reaction is essentially complete as shown by the almost complete disappearance of the violet, insoluble chromic trichloride. A heavy, red homogeneous crystalline precipitate and a supernatant reddish-brown liquor layer can now be observed. The cold mixture is filtered through a glass frit, and the red solid on the filter (almost quantitative yield) is washed 4 times with 20-ml. portions of cold (10° C.) tetrahydrofuran. The red solvated triphenyl chromium complex, I, is then dried at room temperature/20 mm. for 3 hours; 23.3 grams for a 58% yield (after considerable loss by washing), based on the formula $Cr(C_6H_5)_3 \cdot (C_4H_8O)_6 \cdot (MgBrCl)_3$.

Upon diluting a tetrahydrofurane solution of the red complex, I, with diethyl ether at room temperature, a dark red, solvated triphenyl chromium crystalline precipitate, II, is obtained which has the formula $$(C_6H_5)_3Cr(C_4H_8O)_3$$

which is still heat and light stable. However, both I and II are rearranged by high vacuum, e.g., 0.1 mm., or by treatment in solid form with diethyl ether, to a black pyrophoric material, III, which is extremely reactive and involves π-complexed structure. The weight loss in converting the complex, I, to the black material, III, is 39–40%, which corresponds to the loss of the 6 moles of tetrahydrofuran in the formula assigned to II. Upon hydrolysis of the black pyrophoric material, bis(benzene)-chromium and (benzene)(diphenyl)chromium compounds are obtained. However, if the original tetrahydrofuran solution of reactants prior to isolation of the complex, I, is boiled for several hours with phenyl magnesium bromide, the hydrolysis product is exclusively a bis(diphenyl)chromium compound.

When the red complex, I, is treated with $HgCl_2$, it is cleaved to exactly 3 mole equivalents of phenyl mercuric chloride and 1 mole equivalent of $Cr(THF)_3Cl_3$, thus confirming the assigned structure. The red complex, I, is strongly paramagnetic to the extent of 3.89 Bohr magnetons in agreement with a chromium valency of 3. Both I and II are rapidly hydrolyzed by moisture to a green trivalent chromium hexahydrate compound.

*Example 2*

A 142.5-ml. solution of $C_6H_5MgBr$ in tetrahydrofuran solution (87 mmol., 0.61 N) was placed in a Schlenk tube under nitrogen and cooled at −25° C. A 4.5-gram amount of chromium trichloride (28.5 mmol.) was added at once and caused an immediate color change to a brown-green. After rapid stirring for about 8 hours, the reaction mixture contained a heavy red homogeneous salt, a red-brown liquor, and only a few unreacted chromium trichloride flakes. The mixture was filtered at 10° C. and the red salt was washed with tetrahydrofuran (10° C.) and dried at room temperature/20 mm. for 3 hours to give 23.3 grams of $$(C_6H_5)_3Cr.(THF)_3.3MgBrCl(THF)_3$$

for a yield of 72%.

*Analysis.*—Calcd. for $(C_6H_5)_3.3MgBrCl.(C_4H_8O)_6$; Cr, 4.58°; $C_6H_5$:Cr ratio, 3:1. Found: Cr, 4.62%; $C_6H_5$:Cr ratio, 2.99:1 (by molar ratio of phenyl mercury chloride:chromium after treatment with mercuric chloride).

*Example 3*

A mixture of 12.21 grams anhydrous chromium chloride and 0.15 gram zinc dust was extracted in a Soxhlet extractor with boiling tetrahydrofuran for 20 hours (other small amounts of zinc dust, up to 2% or even up to 5% or more of the chromium trichloride are suitable). The extraction tube then contained only black zinc dust, while the tetrahydrofuran extract solution (140 ml.) was deep violet colored and contained precipitated chromium chloride-tetrahydrofuranate. It was found that the hot tetrahydrofuran contained in solution 2.8 grams chromium chloride/100 ml. tetrahydrofuran, and that such a solution could be kept without crystallization at room temperature for several hours, and even at −20° C. for more than an hour. This is in sharp contrast to the negligible solubility of anhydrous chromium trichloride itself in tetrahydrofuran, i.e., less than 0.1 gram and very much less than 0.5 gram/100 ml.

Analysis of the precipitated chromium chloride-tetrahydrofuranate showed it to be a definite compound having three molcules of tetrahydrofuran for each molecule of chromium trichloride.

*Analysis.*—Calcd. for $CrCl_3(C_4H_8O)_3$: Cr, 13.88; Cl, 28.39. Found: Cr, 13.42; Cl, 28.57, 28.19.

While the above chromium trichloride-tetrahydrofuranate has three molecules of bonded tetrahydrofuran, it will be understood that it is possible to have other degrees of complexing, and, in fact, in solution in tetrahydrofuran there are probably six molecules of tetrahydrofuran complexed with chromium trichloride. The crystallized chromium tetrahydrofuranate can be dried by heating in dry air, or by use of vacuum, and is stable under high vacuum and at temperatures up to 100° C. or the like.

Other chromium compounds, particularly those in which chromium has a valence of 2 or 3, can be complexed with tetrahydrofuran according to their coordination numbers and complexing abilities. For example, complexes of the other chromium halides, such as chromium trifluoride, chromium tribromide, and chromium triiodide, can be formed with tetrahydrofuran and in the solid state have three molecules of tetrahydrofuran to each chromium atom. Such tetrahydrofuran solvated chromium compounds are soluble in organic solvents and useful as organic reagents, for example, in the preparation of triaryl chromium compounds.

*Example 4*

The $CrCl_3$-tetrahydrofuran suspension mixture prepared in Example 3 was placed in a 3-necked flask under nitrogen, diluted with 3.0 ml. tetrahydrofuran and cooled to —30° C. To this solution was added 220 ml. 1.07 N phenyl magnesium bromide in tetrahydrofuran in a 45-minute period with vigorous stirring. The violet color of the $CrCl_3$-tetrahydrofuran suspension immediately changed to brown, as a dark red-brown solid precipitated. The mixture was then diluted with 200 ml. tetrahydrofuran and stirred for 4 hours at room temperature to give a completely clear, dark red-brown solution (about 900 ml.) of solvated triphenyl chromium. The product can be isolated from solution by evaporating part of the solvent, and removing the resulting precipitate by filtration as in Example 2.

*Example 5*

The procedure of the Example 3 was exactly followed, except that the amounts of tetrahydrofuran in the final dilution was decreased so that the final volume of reaction mixture was about 750 ml. The mixture was filtered to give 1.2 grams blood-red crystals of $$(C_6H_5)_3Cr.(C_4H_8O)_3$$

of melting point 85° (with decomposition).

*Analysis.*—Calcd. for: $(C_6H_5)_3Cr.(C_4H_8O)_3$: Cr, 10.4%; $C_4H_8O$, 43.3%. Found: Cr, 10.2%; $C_4H_8O$, 41.5%. The product contained 0.18% halide as an impurity.

*Example 6*

A dilute solution of $(C_6H_5)_3Cr$ Grignard complex solvated with tetrahydrofuran was diluted with 1 part by volume of diethyl ether to cause precipitation of a small amount of $(C_6H_5)Cr.(C_4H_8O)_3$ as red needles.

*Analysis.*—Calcd. for $(C_6H_5)_3Cr.(C_4H_8O)_3$: Cr. 10.4%; $C_6H_5$, 46.2%. Found: Cr, 9.8%; $C_6H_5$, 40.2%.

*Example 7*

A 1.7-gram quantity of the red, solid $$(C_6H_5)_3Cr.(MgBrCl)_3.(C_4H_8O)_6$$

was placed in a 0.05 mm. vacuum at room temperature (other temperatures, e.g., 20 to 40° C. or the like, are also suitable) for about 3 hours at which time it had rearranged to a black material admixed with white magnesium salts. The product was soluble in tetrahydrofuran, insoluble in ether, and was extremely pyrophoric. Careful hydrolysis of the black material by dropwise addition of water (ice water cooling) followed by addition of benzene, produced a benzene solution of bis-(benzene)$Cr^o$ and (benzene)$Cr^o$(diphenyl). These compounds were then oxidized by contacting the benzene solution with air, extracted with water, and precipitated from aqueous solution by addition of sodium tetraphenylboron as tetraphenylboron salts, 0.26 gram; the isolated salts contained 43% of (benzene)$_2Cr^+BO_4^-$, the salts being identified by their crystals and infrared spectra. In a repetition of the above procedure, 56 to 60% of the bis-(benzene) salt and 40 to 44% of the benzene diphenyl salt were obtained. The $\pi$ complex salts containing chromium in the zero valence state could, of course, be isolated as such by evaporating benzene from the benzene solutions thereof in the manner taught in the aforesaid application S.N. 616,224.

*Example 8*

A 4.44-gram amount of red, solid $$(C_6H_5)Cr.3(MgBrCl).6(C_4H_8O)$$

was treated with diethyl ether and immediately rearranged to a black, pyrophoric material. Upon hydrolysis, followed by treatment of the resulting aqueous solution with sodium tetraphenyl boron, bis-(benzene)$Cr^+BO_4^-$ and (benzene)(diphenyl)$Cr^+BO_4^-$ were isolated in a yield of 21.6% based on chromium. A repetition of the procedure produced the tetraphenyl boron salts in yield of 23.2% based on chromium, and in a ratio of about 40 parts bis(benzene) compound for 60 parts benzene diphenyl compound, by infrared spectra.

*Example 9*

Treatment of a small amount of solid $$(C_6H_5)_3Cr.(C_4H_8O)_3$$

with diethyl ether produced a black pyrophoric material. By following the isolation procedure of Example 7, the bis(benzene)chromium and (benzene)(diphenyl)-chromium tetraphenylboron salts were obtained in about a 50:50 ratio as determined from infrared spectra.

*Example 10*

A small sample of solid $(C_6H_5)Cr.3(C_4H_8O)$ was heated in a narrow tube under nitrogen and normal pressure. At 85° C. the sample decomposed with foaming to produce a black material. Upon addition of water, a yellow solution was formed from which the tetraphenylboron salts were precipitated when sodium tetraphenylboron was added.

*Example 11*

A solution of triphenyl chromium solvated with tetrahydrofuran produced as described herein was boiled with a 6 molar excess of phenyl magnesium bromide in tetrahydrofuran for two hours. Upon hydrolysis followed by addition of sodium tetraphenylboron to the resulting aqueous solution, bis(diphenyl)$Cr^+BO_4^-$ was obtained in 16% yield; identification by infrared spectrum.

*Example 12*

A 10.4-gram amount of $$(C_6H_5)_3Cr.3(MgBrCl).6(C_4H_8O)$$

was rearranged by treatment at 50° C., 0.05 mm. to produce black material. The black material was mixed with 70 ml. 1.1 N phenyl magnesium bromide in tetrahydrofuran and stirred for two hours at room temperature. The mixture was then boiled for two hours. The mixture was then hydrolyzed and the product was isolated as the tetraphenylboron salt, 0.61 gram, in ratio of about 20 parts bis(benzene)chromium salt to 80 parts (benzene)(diphenyl)chromium salt. The results indicate that reaction with Grignard reagent will not take place after the triphenyl chromium compound has rearranged to a π-complex compound.

The stoichiometric proportions of 3 moles of Grignard reagent to 1 mole of chromic trichloride are very suitable for the present reaction as near quantitative yields result. However, other proportions can be suitably employed, for example, from about 1 mole of Grignard reagent, such as phenyl magnesium bromide, to about 10 moles of Grignard reagent for each mole of chromium halide compound.

The degree of tetrahydrofuran solvation and the presence or absence of magnesium salts in the precipitated triarylchromium is dependent upon the concentration of the materials in tetrahydrofuran. If the solution is dilute, the triaryl chromium will precipitate with 3 moles of solvating tetrahydrofuran, while the magnesium salts remain in solution. However, if a concentrated solution is employed, the triaryl chromium compound will have 3 moles of solvating tetrahydrofuran and also 3 moles of magnesium salt solvated with 3 additional moles of tetrahydrofuran. The state in which the triaryl chromium compounds are precipitated will vary to some extent with conditions, but, in general, a reaction conducted with sufficient tetrahydrofuran to produce dilute solution of triarylchromium compound, e.g., containing no more than 0.1 mole triaryl chromium compound per liter of solution, will cause precipitation of the product containing 3 moles of tetrahydrofuran; while a reaction conducted in concentrated solution, i.e., sufficient to produce concentrated solutions of product, e.g., 0.2 mole/liter or more of triaryl chromium compound, will cause precipitation of the product containing 6 moles of tetrahydrofuran and 3 moles of magnesium salt; and moderately concentrated solutions will cause precipitation of mixtures of the solvated products.

In the process of our invention the Grignard reagents can be reacted with a chromium halogen compound under the usual conditions for Grignard reactions. Air and moisture are excluded to avoid undue destruction of the Grignard reagents. The aforesaid reaction will, of course, be conducted under conditions which do not cause decomposition of the desired products, i.e., non-decomposing conditions, for example, temperatures of the order of from about the temperature of Dry Ice up to 0° C. or so will ordinarily be used, although temperatures up to room temperature or higher can be used.

Chromyl chloride (CrO$_2$Cl$_2$) is a very suitable chromium halide for use in our invention. Anhydrous chromic chloride also works very well. Other chromous and chromic halides can also be used, particularly the bromides, iodides and chlorides; for reasons of economy the chlorides will ordinarily be employed, e.g., CrCl$_2$, CrCl$_3$, and CrO$_2$Cl$_2$. Because of its solubility in organic solvents, the novel Cr(C$_4$H$_8$O)$_3$Cl$_3$ form of chromium trichloride is particularly suitable. The chromium compounds should be anhydrous in order to avoid undue destruction of Grignard reagent. The reaction to prepare trivalent chromium compounds is conducted in the presence of tetrahydrofuran as solvent. It is possible to also have minor proportions of other Grignard solvents or diluents, e.g., ethers, dioxane, benzene, toluene, etc., present so long as they do not interfere with the tetrahydrofuran solvation of the products. In general, any of the Grignard conditions in the aforesaid S.N. 616,224, or in the copending application of Harold H. Zeiss, S.N. 649,640, can be employed in the present invention, except that the present process of preparing trivalent chromium compounds requires tetrahydrofuran.

The process of the present invention is adaptable to converting any aliphatic or aryl halogen compound capable of forming a Grignard reagent in the normal manner, into an organo chromium compound containing covalent carbon-to-chromium bonds. As examples of such aryl halogen compounds, the following can be named:

Phenyl bromide
1,4-dibromobenzene
1,2-dibromobenzene
p-Bromotoluene
p-Iodotoluene
p-Bromostyrene
p-Bromo-α-methylstyrene
Bromosiylene
Phenyl chloride
α-Bromonaphthalene
β-Bromonaphthalene
α-Bromoanthracene
β-Bromophenanthrene
p-Diethylaminobromobenzene
m-Bromotoluene
o-Bromotoluene
1-bromo-4-chlorobenzene
α-Bromotetralin
Pentamethylbromobenzene
m-Fluorobromobenzene
p-Ethylbromobenzene
p-Butylbromobenzene
p-Isobutylbromobenzene
p-Sec-butylbromobenzene
p-t-Butylbromobenzene
p-Hexylbromobenzene
p-Phenylbromobenzene, etc.

As will be apparent from the above compounds, the method of the present invention is applicable to halogenated aryl hydrocarbons and to other aryl halogen compounds which do not contain active hydrogen atoms, unsaturated carbon to oxygen bonds, or other functional groups capable of destroying or reacting with Grignard reagents. The above compounds are also applicable in the preparation of bis(arene)Mo and bis(arene)W compounds.

As aliphatic halogen compounds, the following are examples from which Grignard reagents can be prepared and which are useful in preparing aliphatic chromium compounds:

Methyl chloride
Ethyl chloride
Ethyl bromide
Propyl chloride
Isopropyl chloride
Allyl chloride
Butyl chloride
t-Butyl chloride
Pentyl bromide
Hexyl chloride
Octyl chloride, etc.

The halogen compounds of aliphatic hydrocarbons, e.g., alkyl halides are especially suitable.

The above compounds are also useful in the preparation of aliphatic tungsten and molybdenum compounds.

The aryl compounds of group VI metals taught herein are intermediates in the preparation of π complex structures, e.g., bis(benzene)chromium, bis(benzene)tungsten and bis(benzene)molybdenum, which are useful as metal plating agents as taught in the aforesaid applications, S.N. 616,224 and S.N. 649,640; and as catalytic materials, for example, when combined with aluminum triisobutyl in molar ratio such as 1:1, in catalyzing the low pressure polymerization of ethylene. The aryl and alkyl compounds of group VI metals have other and further uses, for example, as intermediates which can be reacted with carbon monoxide to produce hexacarbonyl compounds: triphenyl chromium or triethyl chromium to produce chromium hexacarbonyl; triphenyl tungsten or triethyl tungsten to produce tungsten hexacarbonyl; and triphenyl molybdenum or triethyl molybdenum to produce molybdenum hexacarbonyl. Other and further uses for the novel organo-metal compounds disclosed herein will occur to those skilled in the art now that their existence has been disclosed. The high reactivity of the tri-substituted chromium compounds suggests the application of triaryl and trialkyl chromium compounds in Grignard-type coupling or addition reactions.

This application is a continuation-in-part of our application Serial No. 698,376, filed November 25, 1957, now abandoned.

What is claimed is:

1. The process of preparing aryl-chromium compounds in which chromium is in the trivalent state which comprises reacting aryl magnesium halide in which the aryl group is an aromatic hydrocarbon radical containing up to three aromatic rings with chromium halides in tetrahydrofuran.

2. The process of preparing triarylchromium compounds which comprises reacting arylmagnesium halide in which the aryl group is an aromatic hydrocarbon radical containing up to three aromatic rings with chromium trichloride in tetrahydrofuran.

3. The method of claim 1 in which the chromium halide is chromyl chloride.

4. The method of causing rearrangement of a tetrahydrofuran-solvated triarylchromium compound to a π-complexed structure which comprises volatizing the solvated tetrahydrofuran.

5. Triaryl chromium possessing carbon-to-chromium covalent bonds and solvated with tetrahydrofuran, the aryl groups being aromatic hydrocarbon radicals containing up to three aromatic rings.

6. Triphenylchromium solvated with tetrahydrofuran.

7. Chromium trichloride solvated with tetrahydrofuran.

8. A solution of chromium chloride in tetrahydrofuran in which the chromium chloride is in the state of solvation with tetrahydrofuran and is present in solution in amounts greater than 0.5 gram/100 ml. tetrahydrofuran.

9. A method of preparing tetrahydrofuran-solvated chromium trichloride which comprises treating chromium trichloride with tetrahydrofuran in the presence of a small amount of zinc.

10. The method of preparing triphenyl chromium which comprises treating phenyl magnesium bromide with chromium trichloride in which chromium trichloride is utilized in the form of the solution of claim 16.

11. As a composition of matter,

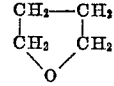

in dry, isolated form.

References Cited in the file of this patent
UNITED STATES PATENTS 2,838,508    Ramsden _____ June 10, 1958
2,873,275    Ramsden _____ Feb. 10, 1959

OTHER REFERENCES

Hein et al. Berichte Deut. Chem. Gesell, vol. 59 (1926), 362–6; vol. 61 (1928), page 2255.

Cotton: Chemical Reviews, vol. 55 (1955), pages 563–71.

Fieser: Organic Chemistry, 3rd ed. (1956), pages 38 and 133.

Udy: Chemistry of Chromium (Reinhold Publ. 1956), pages 240–5.

UNITED STATES PATENT OFFICE
CERTIFICATE OF CORRECTION

Patent No. 3,033,878                                            May 8, 1962

Harold H. Zeiss et al.

It is hereby certified that error appears in the above numbered patent requiring correction and that the said Letters Patent should read as corrected below.

Column 3, line 55, for "-20 C." read -- -20° C. --; column 10, line 4, for the claim reference numeral "16" read -- 8 --; same column 10, lines 6 to 9, the formula should appear as shown below instead of as in the patent:

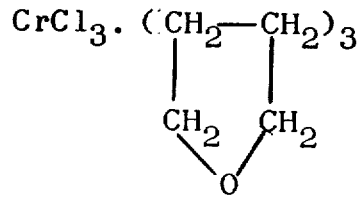

Signed and sealed this 4th day of September 1962.

(SEAL)
Attest:

ERNEST W. SWIDER
Attesting Officer

DAVID L. LADD
Commissioner of Patents